(12) United States Patent
Dunn

(10) Patent No.: US 6,772,593 B2
(45) Date of Patent: Aug. 10, 2004

(54) SOLAR VORTEX ELECTRIC POWER GENERATOR

(76) Inventor: Michael A. Dunn, P.O. Box 1468, Laytonville, CA (US) 95454

( * ) Notice: Subject to any disclaimer, the term of this patent is extended or adjusted under 35 U.S.C. 154(b) by 0 days.

(21) Appl. No.: 09/850,643

(22) Filed: May 7, 2001

(65) Prior Publication Data

US 2002/0162329 A1 Nov. 7, 2002

(51) Int. Cl.[7] .................................................. F03G 6/00
(52) U.S. Cl. .................................... 60/641.11; 60/641.8
(58) Field of Search ............................ 60/641.8, 641.11

(56) References Cited

U.S. PATENT DOCUMENTS

| | | | | |
|---|---|---|---|---|
| 4,334,524 A | * | 6/1982 | McCullough et al. | 126/650 |
| 4,363,703 A | * | 12/1982 | ElDifrawi et al. | 203/10 |
| 4,433,544 A | * | 2/1984 | Wells et al. | 60/641.12 |
| 4,441,484 A | * | 4/1984 | Greiner | 126/630 |
| 4,452,046 A | * | 6/1984 | Valentin | 60/641.11 |
| 4,526,162 A | * | 7/1985 | Arai | 126/709 |
| 4,856,281 A | * | 8/1989 | Taylor | 60/641.9 |
| 5,694,774 A | * | 12/1997 | Drucker | 60/641.11 |
| 5,915,466 A | * | 6/1999 | Aakalu et al. | 165/121 |

* cited by examiner

*Primary Examiner*—Hoang Nguyen

(57) ABSTRACT

The SOLAR VORTEX ELECTRIC POWER GENERATOR utilizes hot, unstable air on a flat surface when drawn under the collector surface to rise in a central tower where it acts as a controlled tornado turning blades and a shaft to power a generator. This provides power during peak summer demand for air conditioners and a water pump can also be driven directly by the sea to power a reverse osmossis plant. One square mile of collector area at 25% effeciency on a hot summer day can provide 640 megawatts at the generator. This is very cheap to make as surplus, rusty corrigated sheet steel can be used as the collector.

1 Claim, 1 Drawing Sheet

SOLAR VORTEX ELECTRIC POWER GENERATOR

BACKGROUND OF THE INVENTION

I remember reading years ago of hot unstable air forms on a flat desert floor and of how dust devils once started by a jack rabbit etc. then started moving across the desert but they didn't get very big as hot air could only be effectively drawn from a small area. This invention simply draws hot air through slots or perforations in a flat metal surface and channels it underneath to a central tower where it turns blades as it rises and thus powers a generator. Also air moving towards a central postion in the northern hemisphere rotates counterclockwise effecting a controled tornado.

SUMMARY OF THE INVENTION

As one killowat of solar energy falls on each square meter of earth in the summer one square mile of thin sheet steel in the desert with only 25% efficiency should provide 640 megawatts of electricity with zero pollution and real cheap construction costs.

This power is available during peak summer demand for air conditioning! Consider the possibilities as this could power reverse osmossis by the sea turning desert into prime farm land.

DETAILED DESCRIPTION OF THE INVENTION

Figure 1:
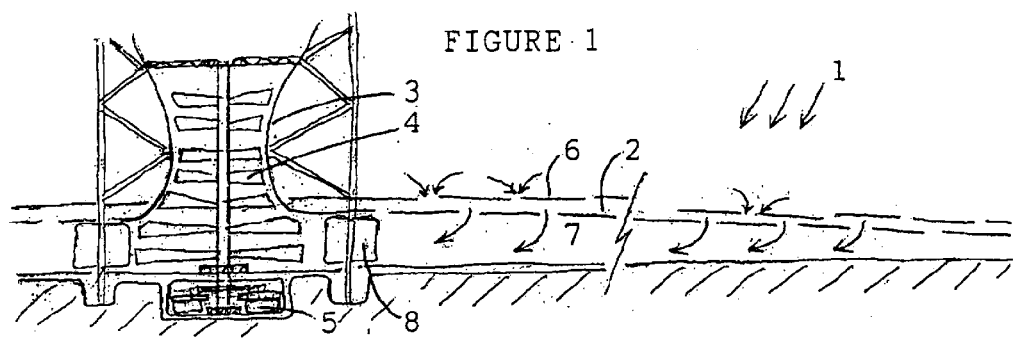
FIG. 1 OVERVIEW CROSS SECTION
Figure 2:
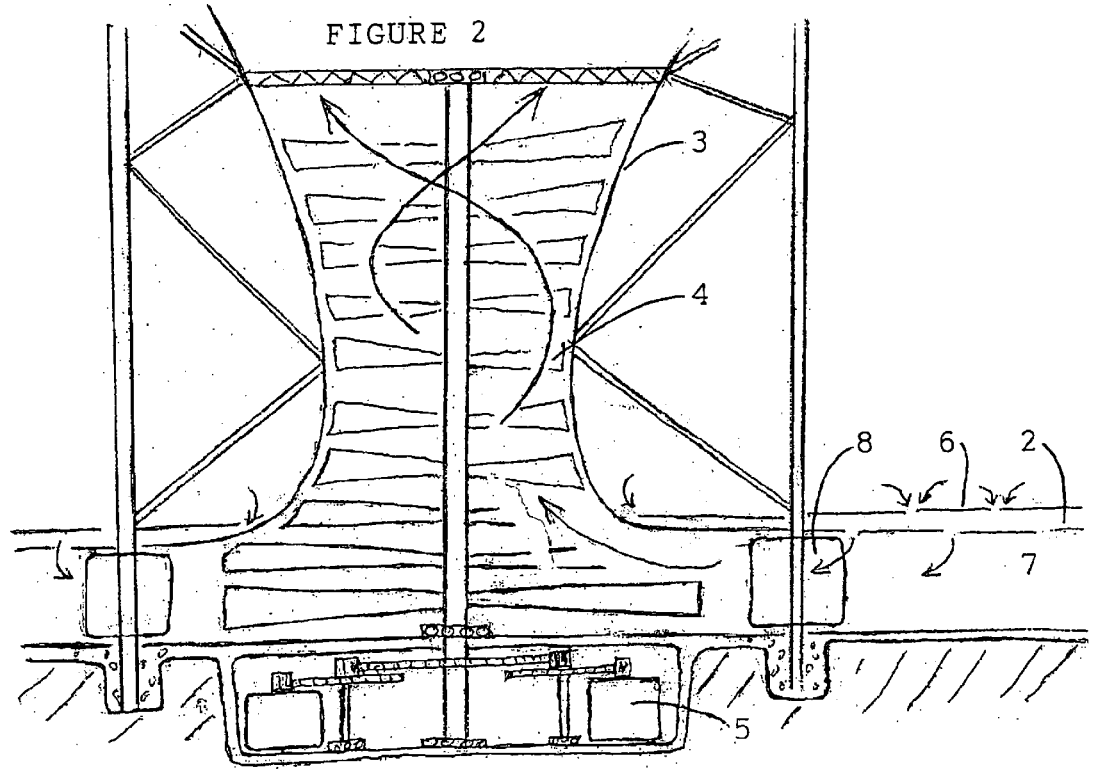
FIG. 2 CENTRAL TOWER CROSS SECTION
Figure 3:
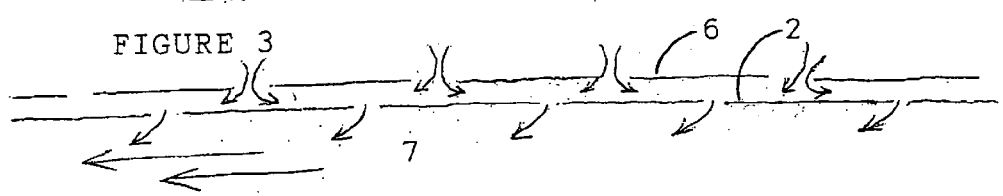
FIG. 3 HOT AIR COLLECTOR CROSS SECTION

The SOLAR VORTEX ELECTRIC POWER GENERATOR utilizes hot air which forms on a flat, absorbing surface FIGS. 1–2 in strong sunlight 1 when drawn through slots or perforations in the collecting surface 2 and then drawn to a central tower 3 rising and turning blades 4 to power a generator 5 or directly to drive pumps for reverse osmossis etc.

The addition of a transparent, perforated surface 6 about one foot over the collector surface would negate the detremental affects of winds and if infrared reflective would increase efficiecy.

As the heated air 7 is drawn towards the central tower it aquires a strong counterclockwise movement which will require lower blades to be oriented perpendicular to the ground while blades higher in the tower will be oriented to strike the rising air.

Control vanes 8 which can control air flow to the central tower are necessary to limit rpm's and to provide emergency shutdown. This is essentially a controled tornado.

Generators or pumps 5 would be located under the central tower with gearing to up the rpm's.

Imagine cheap, pollution free generating capacity on desert wasteland providing power at peak demand or providing pure water.

I claim:

1. A solar energy generating apparatus for utilizing hot, unstable air to generate electricity comprising:

a relatively flat solar collector heated by solar energy having plates with slots or perforations;

a perforated or slotted, transparent cover for covering said solar collector to negate the detremental affects of winds;

wherein heated air are drawn under the collector surface to channel air to an air turbine in a central stack for driving electrical generators through a plurality of adjustable vanes, said vanes are used to control the rpm and to provide shutdown if necessary;

a water pump is driven directly to power a reverse osmossis plant for a desert city.

* * * * *